(12) United States Patent
Kwon et al.

(10) Patent No.: US 10,671,141 B2
(45) Date of Patent: Jun. 2, 2020

(54) STORAGE DEVICE AND METHOD OF CONTROLLING LINK STATE THEREOF

(71) Applicant: Samsung Electronics Co., Ltd., Suwon-si, Gyeonggi-do (KR)

(72) Inventors: Ohsung Kwon, Seoul (KR); Youngjun Yoo, Suwon-si (KR); Hojun Shim, Yongin-si (KR); Kwanggu Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 190 days.

(21) Appl. No.: 15/711,397

(22) Filed: Sep. 21, 2017

(65) Prior Publication Data

US 2018/0120918 A1    May 3, 2018

(30) Foreign Application Priority Data

Oct. 31, 2016 (KR) .................. 10-2016-0143511

(51) Int. Cl.
| | | |
|---|---|---|
| *G06F 1/3215* | (2019.01) | |
| *G06F 1/3234* | (2019.01) | |
| *G06F 1/3228* | (2019.01) | |
| *G06F 1/3287* | (2019.01) | |
| *G06F 3/06* | (2006.01) | |

(52) U.S. Cl.
CPC ............ *G06F 1/3215* (2013.01); *G06F 1/325* (2013.01); *G06F 1/3228* (2013.01); *G06F 1/3234* (2013.01); *G06F 1/3253* (2013.01); *G06F 1/3275* (2013.01); *G06F 1/3287* (2013.01); *G06F 3/0625* (2013.01); *G06F 3/0688* (2013.01); *G06F 2213/00* (2013.01); *Y02D 10/151* (2018.01)

(58) Field of Classification Search
CPC .... G06F 3/0688; G06F 3/0625; G06F 1/3275; G06F 1/3215; G06F 1/3228; G06F 1/3234; G06F 1/325; G06F 1/3253; G06F 1/3287; G06F 2213/00; Y02D 10/151
USPC ....................................................... 713/323
See application file for complete search history.

(56) References Cited

U.S. PATENT DOCUMENTS

| | | |
|---|---|---|
| 7,647,517 B2 | 1/2010 | Tseng et al. |
| 8,689,028 B2 | 4/2014 | Diefenbaugh et al. |
| 8,972,640 B2 | 3/2015 | Wagh |
| 9,117,036 B2 | 8/2015 | Tresidder |
| 9,256,268 B2 | 2/2016 | Wang et al. |

(Continued)

*Primary Examiner* — Ji H Bae
(74) *Attorney, Agent, or Firm* — Harness, Dickey & Pierce, P.L.C.

(57) ABSTRACT

A method of controlling a link state of a communication port of a storage device according to the present inventive concepts includes setting the link state of the communication port to a link active state that can exchange data with a host, determining a holding time of a first standby state among link states of the communication port, changing the link state of the communication port to the first standby state, monitoring whether an exit event occurs during the holding time from the time when a transition to the first standby state occurs, and in response to an exit event not occurring during the holding time, changing the link state of the communication port to a second standby state. A recovery time from the first standby state to the link active state is shorter than a recovery time from the second standby state to the link active state.

16 Claims, 10 Drawing Sheets

(56) References Cited

U.S. PATENT DOCUMENTS

| | | | |
|---|---|---|---|
| 2006/0265612 A1* | 11/2006 | Tseng | G06F 13/385 713/300 |
| 2008/0288798 A1* | 11/2008 | Cooper | G06F 1/3228 713/322 |
| 2012/0054516 A1* | 3/2012 | Shayer | G06F 1/3225 713/320 |
| 2013/0007483 A1* | 1/2013 | Diefenbaugh | G06F 1/3206 713/320 |
| 2015/0121057 A1* | 4/2015 | Arora | G06F 1/3228 713/100 |
| 2015/0220278 A1* | 8/2015 | Sarcone | G06F 3/061 711/103 |
| 2015/0227476 A1 | 8/2015 | Murphy et al. | |
| 2015/0370315 A1 | 12/2015 | Unnikrishnan et al. | |

\* cited by examiner

STORAGE DEVICE AND METHOD OF CONTROLLING LINK STATE THEREOF

CROSS-REFERENCE TO RELATED APPLICATIONS

This U.S. non-provisional patent application claims priority under 35 U.S.C. § 119 of Korean Patent Application No. 10-2016-0143511, filed on Oct. 31, 2016, the entire contents of which are hereby incorporated by reference.

BACKGROUND

The inventive concepts relate to semiconductor memory devices, and more particularly, to a storage device and/or a method of controlling a link state of a communication port of the storage device.

Flash memory devices are widely being used as audio and video data storage medium of information devices such as computers, smart phones, digital cameras, camcorders, voice recorders, MP3 players, handheld PCs, etc.

A typical example of a flash memory-based high capacity storage device includes a solid state drive (SSD). As the use of SSDs explosively increases, the use of the SSDs is variously divided. For example, the use of SSDs may be subdivided into SSDs for servers, SSDs for clients, SSDs for data centers, etc. An SSD interface should be able to provide an optimum speed and optimum reliability based on its use. There are SATA, SAS, etc. as the optimum SSD interfaces that can satisfy that requirement. A SSD that applies a PCIe-based interface is currently being actively studied and applied.

A host device fitted with a SSD may include various computer systems. For example, a SSD may be connected to a server, a data center, or a personal computer (PC). A communication port of a host device and a SSD may be managed in various link states to reduce power consumption. For example, a link state of a communication port may be managed in a full active state where data communication is possible, a standby state where data is only received, or a slip state where a power supply is shut off. However, a control method of a link state that considers power consumption and performance is continuously required for a communication port that uses a serial interface.

SUMMARY

Some example embodiments of the inventive concepts provide a method of controlling a link state of a communication port of a storage device. The method may include setting the link state of the communication port to a link active state that can exchange data with a host, determining a holding time of a first standby state among link states of the communication port, changing the link state of the communication port to the first standby state, monitoring whether an exit event occurs during the holding time from when a transition to the first standby state occurs, and in response to an exit event not occurring during the holding time, changing the link state of the communication port to a second standby state. A recovery time from the first standby state to the link active state is shorter than a recovery time from the second standby state to the link active state.

Some example embodiments of the inventive concepts provide a storage device. The storage device may include a plurality of nonvolatile memory devices, and a storage controller configured to control the plurality of nonvolatile memory devices according to an access request provided from a host through a serial communication port and to change a link state of the serial communication port from a link active state that can exchange data with the host to a first standby state in response to a power management request. The link state enters the first standby state after a holding time of the first standby state is set in advance.

Some example embodiments of the inventive concepts provide a storage controller including a port controller, a CPU, and a flash interface. The port controller is configured to, operate in a plurality of link states including a link active state, a first standby state, and a second standby state, communicate with a host device while in the link active state, receive communications while in the first standby state, transition to the second standby state based on a holding time if an exit event has not occurred, and not receive power while in the second standby state. The CPU is configured to, transmit read/write control information to control nonvolatile memory devices, set a link state of the port controller among the plurality of link states, determine the holding time of the first standby state based on a property or pattern of an access request received from the host, monitor communications received by the port controller while the port controller is in the first standby state to determine whether an exit event has occurred, and set the link state of the port controller to active link state if an exit event occurs while the port controller is in the first standby mode. The flash interface is configured to exchange data with the nonvolatile memory devices based on the read/write control information.

BRIEF DESCRIPTION OF THE FIGURES

Example embodiments of the inventive concept will be described below in more detail with reference to the accompanying drawings. The embodiments of the inventive concepts may, however, be embodied in different forms and should not be constructed as limited to the embodiments set forth herein. Like numbers refer to like elements throughout.

DETAILED DESCRIPTION OF THE EMBODIMENTS

Figure 1:
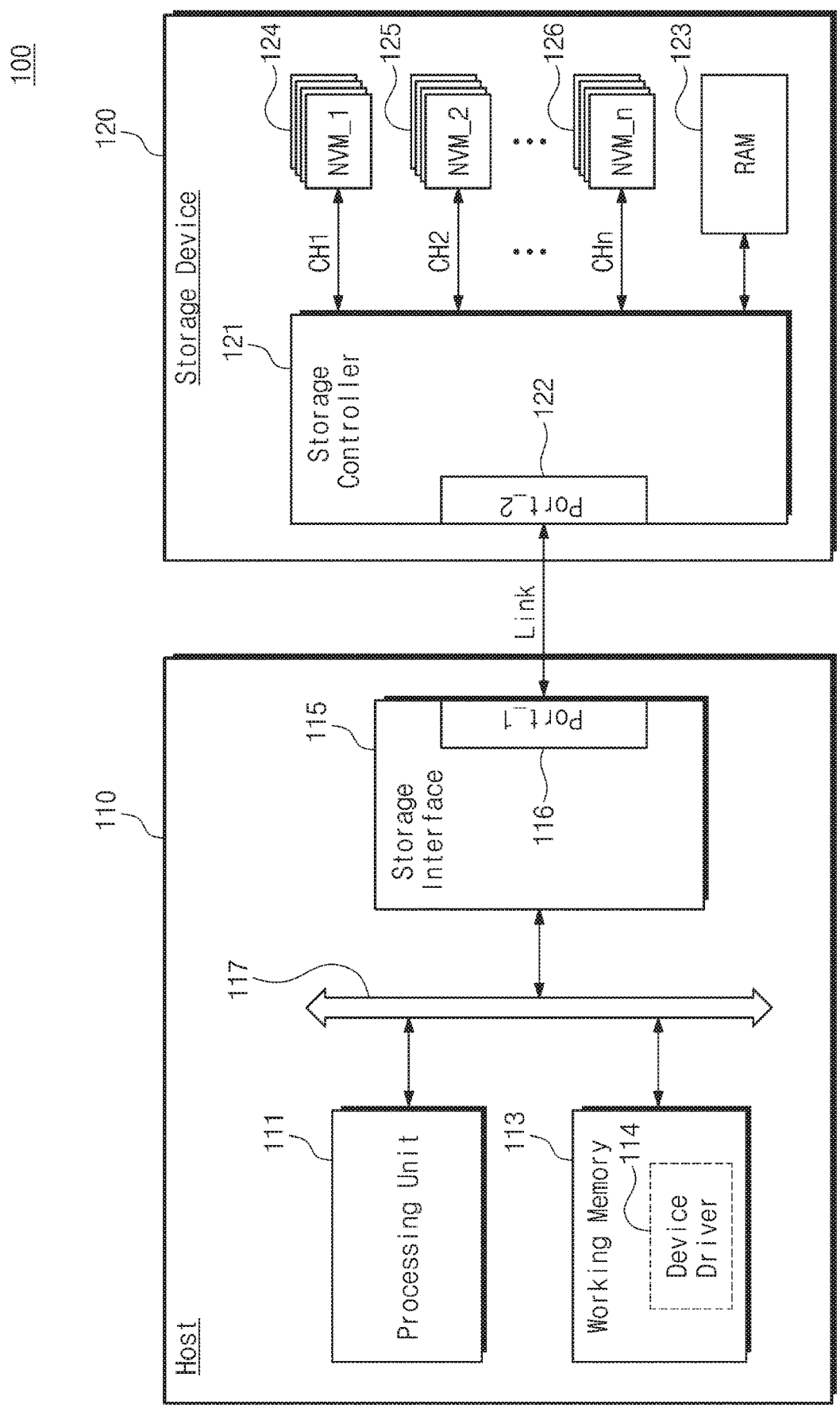
FIG. 1 is a block diagram illustrating a memory system according to some example embodiments of the inventive concepts.

Embodiments of inventive concepts will be described more fully hereinafter with reference to the accompanying drawings, in which embodiments of the invention are shown. These inventive concepts may, however, be embodied in many different forms and should not be construed as limited to the embodiments set forth herein. In the drawings, the size and relative sizes of layers and regions may be exaggerated for clarity. Like numbers refer to like elements throughout.

FIG. 1 is a block diagram illustrating a memory system according to some example embodiments of the inventive concepts. Referring to FIG. 1, a memory system 100 includes a host 110 and a storage device 120.

The host 110 may write data in the storage device 120 or may read data stored in the storage device 120. The host 110 generates a command to write data into the storage device 120 or to read data stored in the storage device 120. A command processing process of the host 110 may be as follows. The host 110 transmits a command to the storage device 120 and receives a complete entry that directs whether to execute the corresponding command and an interrupt associated with the complete entry from the storage device 120. The host 110 may perform an interrupt processing for completing a thread or a task associated with the corresponding command in response to the interrupt. The host 110 may include a processing unit 111, a working memory 113, a storage interface 115, and a system bus 117.

The processing unit 111 may execute various softwares (e.g., an application program, an operating system, a device driver) which are loaded into the working memory 113. The processing unit 111 may execute an operating system (OS) and application programs. The processing unit 111 may be provided in the form of a homogeneous multi-core processor or a heterogeneous multi-core processor.

An application program or data to be processed in the processing unit 111 may be loaded into the working memory 113. An operating system, a file system, etc. may be loaded into the working memory 113. The device driver 114 that performs an interfacing with the storage device 120 may be loaded into the working memory 113 and may be executed. In addition, various softwares for driving devices of the host 110 may be loaded into the working memory 113. An input/output scheduler (not shown) for managing a queue with respect to a command to be transmitted to the storage device 120 may be loaded into the working memory 113. A submission queue (SQ) and a completion queue (CQ) may be managed in the input/output scheduler. The submission queue (SQ) is a queue of commands to be transmitted to the storage device 120. The completion queue (CQ) is a queue of completion entries written by the storage device 120 and represents whether a command requested by the host 110 is completed. The processing unit 111 can determine a parameter for controlling a link state of communication ports (116, 122) with reference to a state of the submission queue (SQ) or the completion queue (CQ). For example, the processing unit 111 may determine a holding time ($\Delta T\_L1$) of a first standby state L1 among link states of the communication ports (116, 122) with reference to a property of a command or a request to be provided to the storage device 120. The link states of the communication ports (116, 122) will be described in detail when describing a function of a storage controller 121.

The storage interface 115 provides a physical connection between the host 110 and the storage device 120. That is, the storage interface 115 may convert a command, an address, data, etc. corresponding to various access requests issued from the host 110 into an interface format of the storage device 120. The storage interface 115 may include the first input/output port 116 for exchanging a signal and data with the storage device 120. The storage interface 115 may electrically transmit/receive a signal and data to/from the storage device 120 through the first input/output port 116.

A protocol of the storage interface 115 may be at least one of a USB (universal serial bus), a SCSI (small computer system interface), a PCI express, an ATA, a PATA (parallel ATA), and a SATA (serial ATA). The present inventive concepts will describe a case where a PCI express is a protocol of the storage interface 115 as an example.

The storage device 120 may access nonvolatile memory devices (124, 125, and 126) or may perform various requested operations in response to a command CMD provided from the host 110. The storage device 120 may include the second input/output port 122 to provide an electrical connection with the first input/output port 116 of the host 110. The storage device 120 can control a link state of the second input/output port 122 according to a control of the host 110 or an internal judgment. That is, the storage device 120 can determine a holding time of a second standby state (L1 Substate) corresponding to the standby state among the link states of the second input/output port 122. The storage device 120 may include the storage controller 121, a RAM 123, and the plurality of nonvolatile memory devices (124, 125 to 126).

The storage controller 121 provides an interfacing between the host 110 and the storage device 120. The storage controller 121 may control a link state of the second input/output port 122. Here, the link state means a power state of the communication ports (Port_1, Port_2) between the host 110 and the storage device 120. The link state may include an active state (L0), a first standby state (L1), and a second standby state (L1 Substate). The link state may further include different states (L2, L3). However, advantages of the present inventive concepts will be described based on the active state (L0), the first standby state (L1), and the second standby state (L1 Substate).

In the case where a communication port is not used or an idle state continues during a specific time in the active state (L0), the storage controller 121 may change the communication port (Port_2) to the first standby state (L1) to manage power. If a training sequence (TS) for requesting a wakeup does not exist for a reference time during which the first standby state (L1) lasts or the holding time ($\Delta T\_L1$), the link state may transit from the first standby state (L1) to the second standby state (L1 Substate). Here, the time reference time during which the first standby state (L1) lasts or the holding time ($\Delta T\_L1$) may be calculated or determined by the host 110 or the storage device 120.

A recovery time of the link state taken to return from the first standby state (L1) to the active state (L0) is much shorter than a recovery time of the link state taken to return from the second standby state (L1 Substate) to the active state (L0). Thus, if the holding time ($\Delta T\_L1$) is adjusted according to a property or a pattern of an access request from the host 110, it is possible to rapidly respond to the access request provided from the host 110 before the link state transits to the second standby state (L1 Substate). Efficiency of power consumption may increase by a proper operation of the first standby state (L1) and the second standby state (L1 Substate) through an adjustment of the holding time ($\Delta T\_L1$).

According to the aforementioned description, in order to change a link state of a communication port to a standby mode, the link state of the communication port (Port_2) changes to the first standby state (L1) that lasts for the holding time ($\Delta T\_L1$) first. If an exit event such as the training sequence (TS) does not exist during the holding time ($\Delta T\_L1$), the link state transits to the second standby state (L1 Substate). According to some example embodiments of the inventive concepts, a length of the holding time ($\Delta T\_L1$) may be adaptively adjusted according to the property or pattern of an access request provided from the host 110. Thus, it is possible to manage a link state of the communication port in consideration of all of performance and reduction of power consumption.

Figure 2:
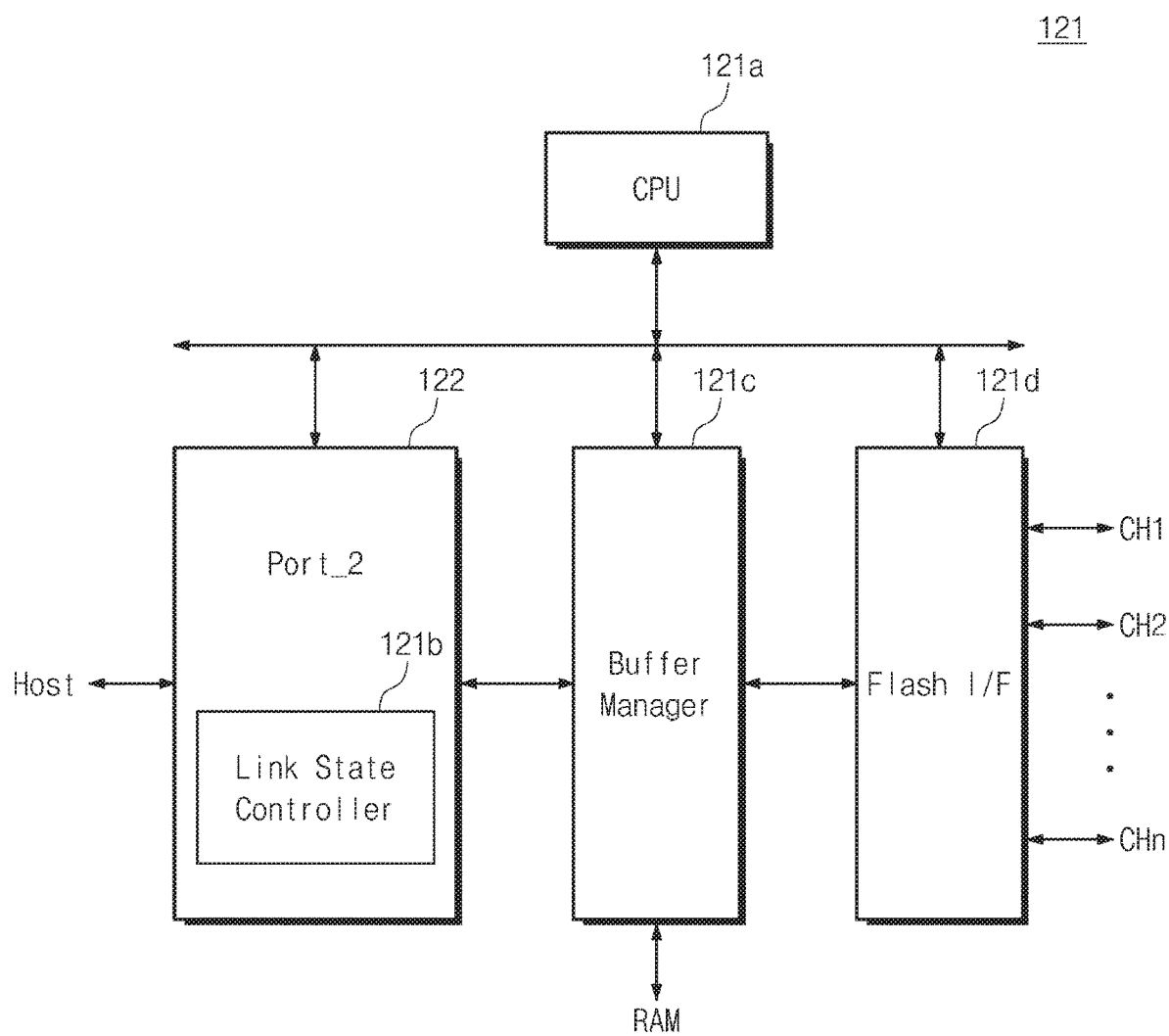
FIG. 2 is a block diagram illustrating a configuration of a storage controller illustrated in FIG. 1.

FIG. 2 is a block diagram illustrating a configuration of a storage controller illustrated in FIG. 1. Referring to FIG. 2, the storage controller 121 includes a central processing unit (CPU) 121a, a second communication port 122, a buffer manager 121c, and a flash interface 121d. The second communication port 122 may also function as a port controller.

The CPU 121a transmits various control information necessary for read/write operations with respect to the nonvolatile memory devices (124, 125, 126) to the second communication port 122 and the flash interface 121d. The CPU 121a may operate according to firmware provided for various control operations of the storage controller 121. For example, the CPU 121a may execute a garbage collection to manage the nonvolatile memory devices (124, 125, and 126) or a flash translation layer (FTL) to perform an address mapping, a wear leveling, etc.

The CPU 121a may set a link state controller 121b to control a link state of the second communication port 122 according to a request of the host 110 or its own decision. The CPU 121a may provide length information of the holding time ($\Delta T\_L1$) during which the first standby state (L1) lasts to the link state controller 121b. The link state controller 121b may include a register to store the holding time ($\Delta T\_L1$) in the link state controller 121b. The CPU 121a may monitor whether a training sequence for a wake up of the communication port 122 is received from the host 110 before the holding time ($\Delta T\_L1$) elapses.

The second communication port 122 may perform a communication with the host 110. The second communication port 122 may transmit or receive a signal or data according to the same communication protocol as the first communication port 116 of the host 110. The second communication port 122 includes the link state controller 121b that performs a link state transition of the inventive concepts. In the case of changing the second communication port 122 to a standby mode, the link state controller 121b transits a link state to the first standby state (L1) first in which the holding time ($\Delta T\_L1$) is adjusted. After that, in the case where an exit event does not exist within the holding time ($\Delta T\_L1$), the link state controller 121b transits a link state to the second standby state (L1 Substate).

The second communication port 122 provides an interface with the storage device 120 in response to a bus format of the host 110. The bus format of the host 110 may be constituted by at least one of a USB (universal serial bus), a SCSI (small computer system interface), a PCI express, an ATA, a PATA (parallel ATA), a SATA (serial ATA), and a SAS (serial attached SCSI). The second communication port 122 may be a thing to which an NVMe protocol fitted with the host 110 that exchanges data in a PCI express manner is applied.

The buffer manager 121c controls read and write operations of the RAM 123 (refer to FIG. 1). The buffer manager 121c temporarily stores write data or read data in the RAM 123. The buffer manager 121c may group a memory area of the RAM 123 into stream units to manage it according to a control of the CPU 121a.

The flash interface 121d may exchange data with the nonvolatile memory devices (124, 125, 126). The flash interface 121d may write data transmitted from the RAM 123 in the nonvolatile memory devices (124, 125, and 126) through memory channels (CH1, CH2, . . . CHn). Read data from the nonvolatile memory devices (124, 125, 126) provided through the memory channels may be collected by the flash interface 121d. The collected data thereafter will be stored in the RAM 123.

According to the storage controller 121, when the link state transits to the standby mode, the link state transits to the first standby state (L1) first where duration time is controlled and then transits to the second standby state (L1 Substate). Here, the duration time corresponds to the holding time ($\Delta T\_L1$) determined by the host 110 or the storage controller 121.

Figure 3:
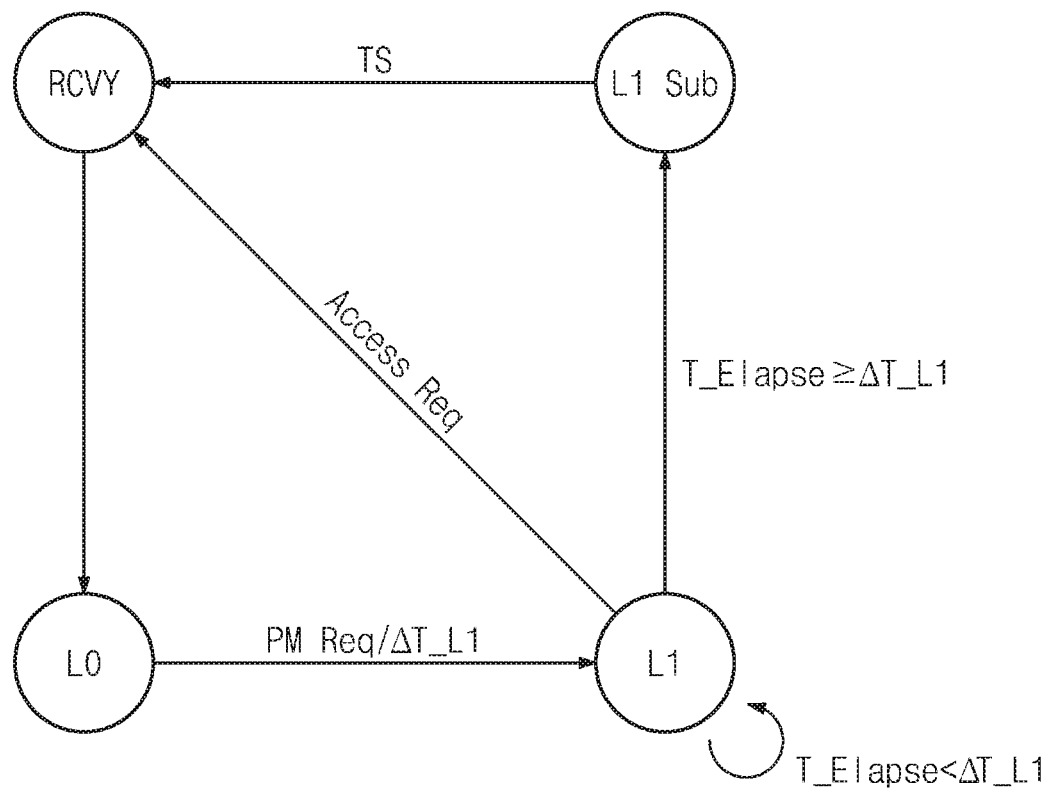
FIG. 3 is a state transition diagram illustrating a link state of a communication port according to some example embodiments of the inventive concepts.

FIG. 3 is a state transition diagram illustrating a link state of a communication port according to some example embodiments of the inventive concepts. Referring to FIG. 3, the link state of the communication port (Port_2) includes the active state (L0), the first standby state (L1), and the second standby state (L1 Substate). Since the remaining various link states (L2, L3) beyond technical category of the inventive concepts, a description thereof is omitted. For convenience of description, a recovery (RCVY) to change the link state from the standby state (L1 or L1 Substate) to the active state (L0) is added. However, the recovery step (RCVY) may be considered as a part of the standby state (L1 or L1 Substate).

First, it is assumed that the link state of the communication port (Port_2) exists in the active state (L0). If a power management request (PM Req.) occurs in the storage device 120 of the active state (L0), the link state of the communication port (Port_2) transits to the first standby state (L1). The holding time ($\Delta T\_L1$) that defines duration time of the first standby state (L1) in the host 110 or the storage controller 120 may be provided together with the power management request (PM Req.).

At the first standby state (L1), a counting for determining whether the holding time ($\Delta T\_L1$) passed may be performed. In the case where elapsed time (T_Elapse) counted after the link state entered the first standby state (L1) is shorter than the holding time ($\Delta T\_L1$), the link state remains in the first standby state (L1). However, in the case where an exist event like an access request from the host 110 occurs before the elapsed time (T_Elapse) exceeds the holding time ($\Delta T\_L1$), the link state moves to the recovery state (RCVY) to change to the active state (L0). In addition, in the case where the exist event does not occur until the elapsed time (T_Elapse) exceeds the holding time ($\Delta T\_L1$), the link state moves to the second standby state (L1 Substate).

At the second standby state (L1 Substate), the link state maintains the second standby state (L1 Substate) until before the exit event occurs. At the second standby state (L1 Substate), the second standby state (L1 Substate) may be maintained until before the training sequence (TS) is provided. If the training sequence (TS) for activation of the communication port (Port_2) is provided, the link state moves from the second standby state (L1 Substate) to the recovery state (RCVY).

A wakeup of the communication port (Port_1, Port_2) is performed in the recovery state (RCVY). When the wakeup of the communication port (Port_1, Port_2) is completed, the link state transits to the active state (L0). The recovery time taken to change from the second standby state (L1 Substate) to the active state (L0) is longer than the recovery time taken to change from the first standby state (L1) to the active state (L0).

In the case where the power management request (PM Req.) occurs, the link state transits to the first standby state (L1) first. The holding time ($\Delta T\_L1$) of the first standby state (L1) may be controlled by the host 110 or the storage controller 120. Thus, if the power management request (PM Req.) occurs, the recovery time can be always reduced as compared with a case where the link state enters the second standby state (L1 Substate).

Figure 4:
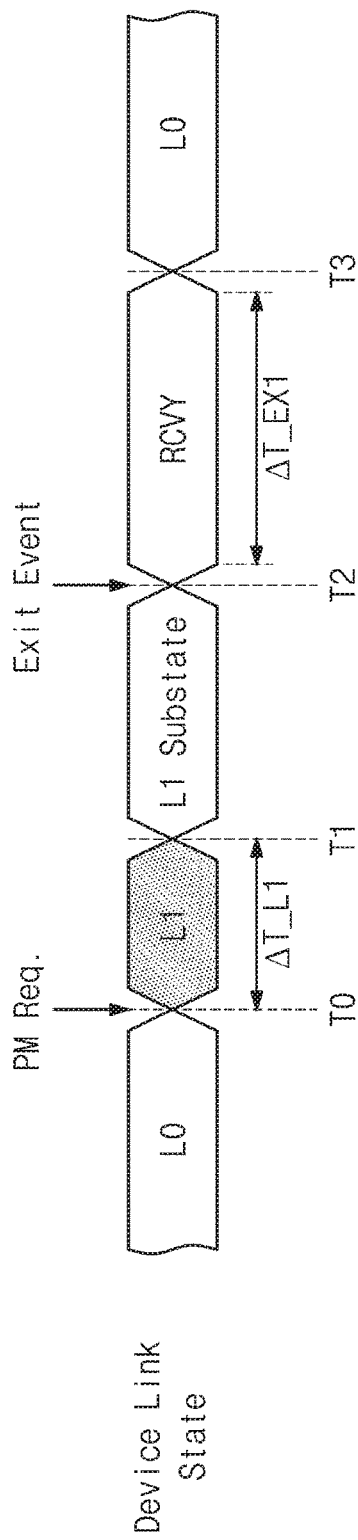
FIG. 4 is a timing diagram illustrating a method of setting a link state according to some example embodiments of the inventive concepts.

FIG. 4 is a timing diagram illustrating a method of setting a link state according to some example embodiments of the inventive concepts. Referring to FIG. 4, a method of changing the link state of the communication ports (Port_1, Port_2) to a standby state will be described. It is assumed that the link state of the storage device 120 initially exists as the active state (L0).

At time T0, the power management request (PM Req.) occurs. Then the link state that remains in the active state (L0) transits to the first standby state (L1). At this time, the holding time ($\Delta T\_L1$) during which the first standby state (L1) lasts may be set.

Time T1 is a time when set holding time ($\Delta T\_L1$) elapsed from the time T0. The first standby state (L1) lasts during holding time ($\Delta T\_L1$) and the exit event does not occur. Thus, at the time T1, the link state transits to the second standby state (L1 Substate).

If the exit event occurs at time T2 at which the second standby state (L1 Substate) lasts, a recovery operation to activate the communication ports (Port_1, Port_2) may be performed. It takes first recovery time ($\Delta T\_EX1$) for the link state to change from the second standby state (L1 Substate) to the active state (L0).

After the recovery, at time T3, the link state transits to the active state (L0). From that point, a transmission of a signal or data through the communication ports (Port_1, Port_2) is possible.

A method of the link state transition of the inventive concepts was described where when a power management request (PM Req.) occurs, the link state of the communication ports (Port_1, Port_2) is set to the first standby state (L1). In addition, the holding time ($\Delta T\_L1$) during which the first standby state (L1) lasts may be adjusted with reference to a property or a pattern of an access request provided from the host 110. Thus, it is possible to implement the storage device 120 that can reduce power consumption and provide a high response speed through the proper setting of the holding time ($\Delta T\_L1$).

Figure 5:
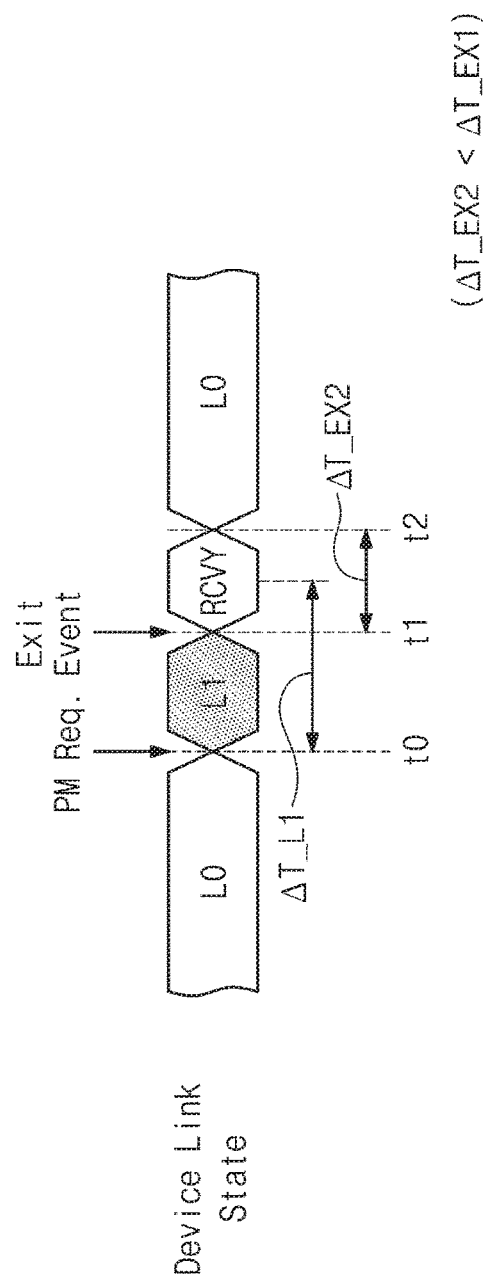
FIG. 5 is a timing diagram illustrating a method of setting a link state according to some example embodiments of the inventive concepts in a specific scenario.

FIG. 5 is a timing diagram illustrating a method of setting a link state according to some example embodiments of the inventive concepts in a specific scenario. Referring to FIG. 5, the communication ports (Port_1, Port_2) of the inventive concepts may provide a link state that can reduce a recovery time to the active state (L0).

At time t0, since the communication ports (Port_1, Port_2) do not perform a data transmission in the active state (L0) during an idle timeout, the power management request (PM Req.) may occur. Then the link state that remains in the active state (L0) transits to the first standby state (L1). At this time, the holding time ($\Delta T\_L1$) during which the first standby state (L1) lasts may be a state already set.

An exit event occurs at time t1 when the holding time ($\Delta T\_L1$) has not yet elapsed after the link state enters the first standby state (L1). For example, it is assumed that the link state is a state where a new access request is transmitted from the host 110. Then the link state should be recovered from the first standby state (L1) to the active state (L0). At the time t1, a recovery is performed with respect to the communication ports (Port_1, Port_2).

A second recovery time ($\Delta T\_EX2$) during which a recovery is performed from the first standby state (L1) to the active state (L0) is shorter than the first recovery time ($\Delta T\_EX1$) described in FIG. 4. After rapidly performing a recovery of the communication ports (Port_1, Port_2), it is possible to respond to the host 110 in the active state (L0).

According to the method of managing the link state described in FIGS. 4 and 5, if a power management request (PM Req.) occurs, the link state transits to the first standby state (L1) where the holding time ($\Delta T\_L1$) is set. The holding time ($\Delta T\_L1$) may be adjusted with reference to a property or a pattern of an access request provided from the host 110. Thus, reduction of power consumption and performance improvement of the communication port can be implemented at the same time through a setting of the holding time ($\Delta T\_L1$).

Figure 6:
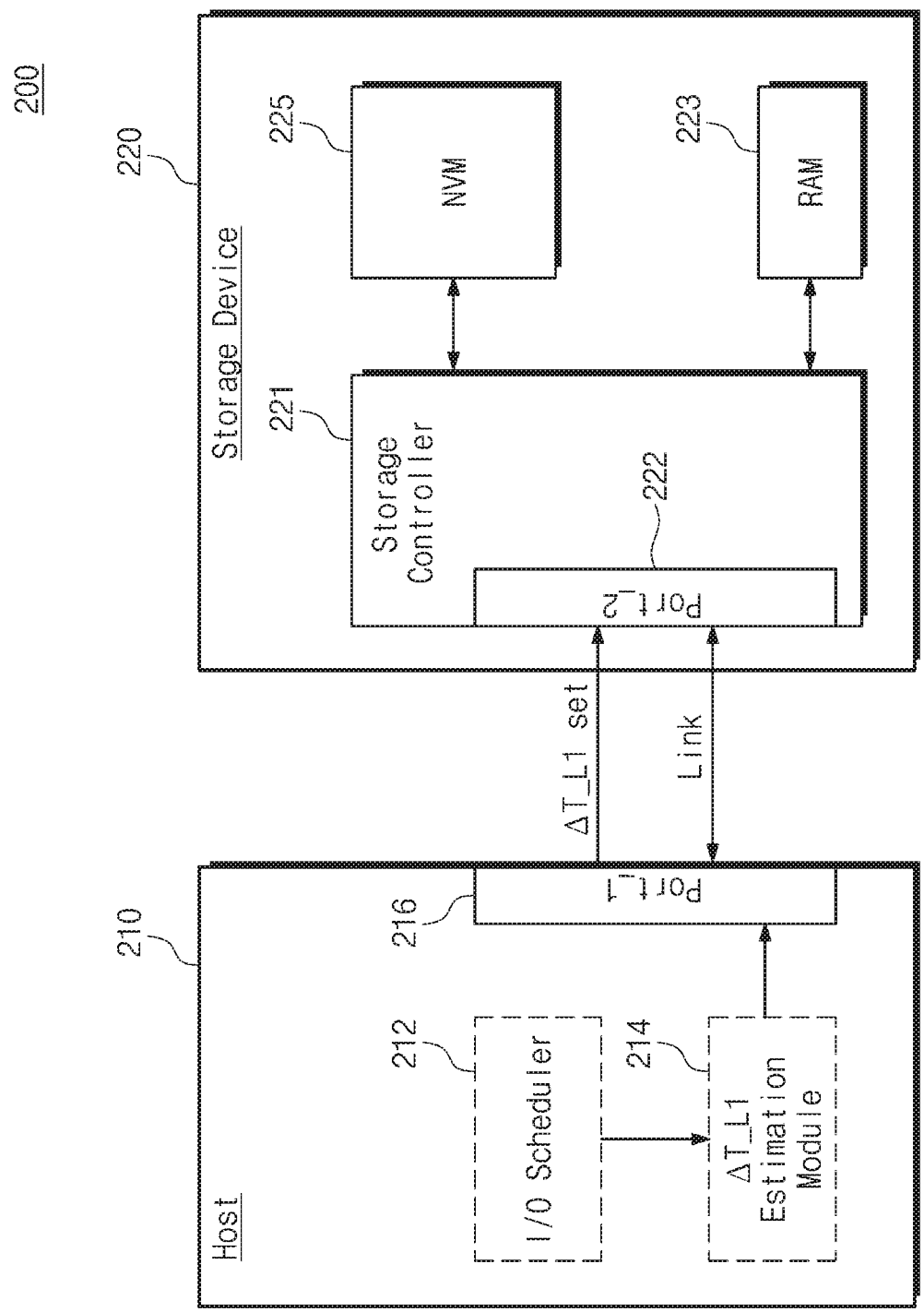
FIG. 6 is a block diagram illustrating a memory system according to other example embodiments of the inventive concepts.

FIG. 6 is a block diagram illustrating a memory system according to other some example embodiments of the inventive concepts. Referring to FIG. 6, a memory system 200 includes a host 210 and a storage device 220. The host 210 of the memory system 200 may control a link state using a property or a pattern of access requests to be provided to the storage device 220. That is, the host 210 may set a holding time ($\Delta T\_L1$) of a first standby state (L1) of communication ports 216 and 222.

The host 210 may determine the holding time ($\Delta T\_L1$) during which the first standby state (L1) lasts using a property or a pattern of commands to be transmitted to the storage device 220. The host 210 may set a link state of the communication ports 216 and 222 such that the first standby state (L1) lasts during the determined holding time ($\Delta T\_L1$). To set the holding time ($\Delta T\_L1$) of the first standby state (L1), the host 210 may include an input/output scheduler 212, a holding time estimation module 214, and a first communication port 216.

In the input/output scheduler 212, commands to be transmitted to the storage device 220 and commands already transmitted to the storage device 220 may be managed as a submission queue and a completion queue respectively. Queues associated with various access requests to the storage device 220 may be generated and updated in the input/output scheduler 212. Information about access requests or commands to the storage device 220 may be provided to the holding time estimation module 214. The input/output scheduler 212 may be embodied in hardware but may be provided in the form of a software module included in a kernel of an operating system.

The holding time estimation module 214 may calculate or estimate the holding time ($\Delta T\_L1$) of the first standby state (L1) using information provided from the input/output scheduler 212. If the holding time estimation module 214 receives commands and address information to be transmitted to the storage device 220 from the input/output scheduler 212, the holding time estimation module 214 may calculate the holding time ($\Delta T\_L1$) of the first standby state (L1) using a command property or an address. For example, in the case where a read command is provided, the holding time estimation module 214 estimates the holding time ($\Delta T\_L1$) of the first standby state (L1) with reference to a size of a read-requested memory area. A link state of the communication ports 216 and 222 may transit to the first standby state (L1) until the time when a read command is provided and data read from an internal nonvolatile memory device 223 of the storage device 220 is output. The holding time ($\Delta T\_L1$) of the first standby state (L1) may be calculated according to a property of the command. Information about the determined holding time ($\Delta T\_L1$) may be provided to the storage device 220 together with the command or in the specific message form.

The storage device 220 controls a link state of the second communication port 222 with reference to the holding time ($\Delta T\_L1$) provided from the host 110. That is, if the link state transits to the first standby state (L1), the storage device 220 transits the link state to the second standby state (L1 Substate) after the holding time ($\Delta T\_L1$) has elapsed. The storage device 220 may include a storage controller 221, a RAM 223, and a nonvolatile memory device 225. Since a function and a configuration of the storage controller 221, the RAM 223, and the nonvolatile memory device 225 are the same as those described in FIG. 1, a description thereof is omitted.

Figure 7:
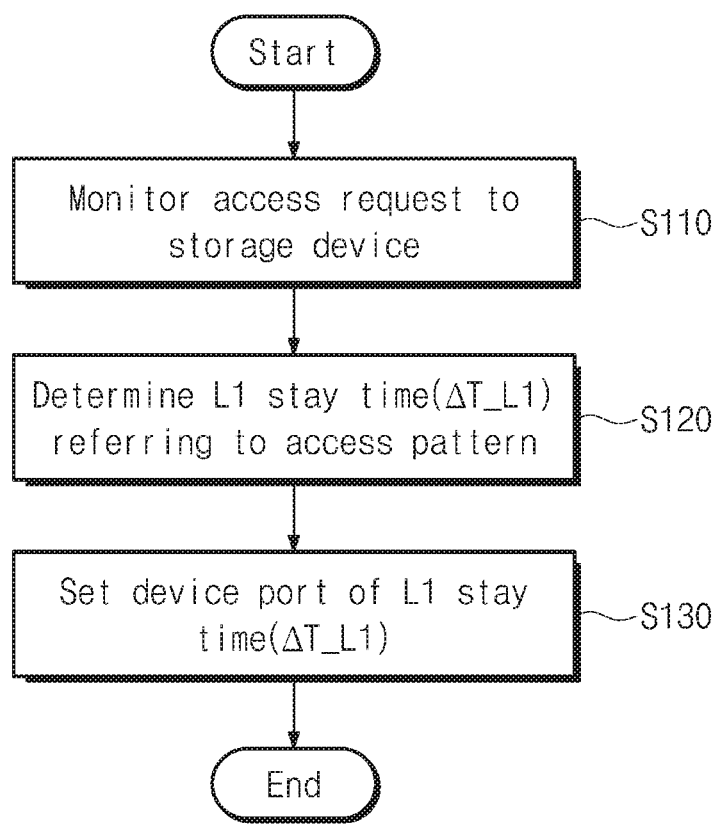
FIG. 7 is a flowchart illustrating a method of controlling a link state performed by a host of a memory system illustrated in FIG. 6.

FIG. 7 is a flowchart illustrating a method of controlling a link state performed by a host of a memory system illustrated in FIG. 6. Referring to FIG. 7, the host 210 can determine the holding time ($\Delta T\_L1$) of the first standby state (L1) with reference to a property or a pattern of an access request to the storage device 220.

In an operation S110, the host 210 monitors an access request to the storage device 220. For example, the host 210 can check a command currently transmitted to the storage device 220 with reference to a queue of the input/output scheduler 212. If a read request is scheduled to be transmitted to the storage device 220, the host 210 may provide information related to the read request to be transmitted to the holding time estimation module 214.

In an operation S120, the holding time estimation module 214 of the host 210 calculates the holding time (($\Delta T\_L1$) of the first standby state (L1) using information about an access request. For example, the holding time ($\Delta T\_L1$) of the first standby state (L1) to be transited after a read command is transmitted may be calculated using a memory size, channel information, etc. using an address. In addition, in the case where a plurality of commands is provided, the holding time ($\Delta T\_L1$) during which the first standby state (L1) lasts may be determined using a transmission pattern of commands.

In an operation S130, the host 210 sets the storage device 220 such that the first standby state (L1) lasts for the determined holding time ($\Delta T\_L1$). For example, the host 210 can set the holding time ($\Delta T\_L1$) of the first standby state (L1) of the storage device 220 by transmitting a message for controlling a link state. However, setting the holding time ($\Delta T\_L1$) of the first standby state (L1) may be executed by various methods such as a method of using a control signal or a side band.

According to some example embodiments of the inventive concepts, a method of setting the holding time ($\Delta T\_L1$) of the first standby state (L1) by the host 210 was described. Commands to be transmitted to the storage device 220 exist in the host 210 and it is possible to rapidly judge a property or a pattern of the commands.

Figure 8:
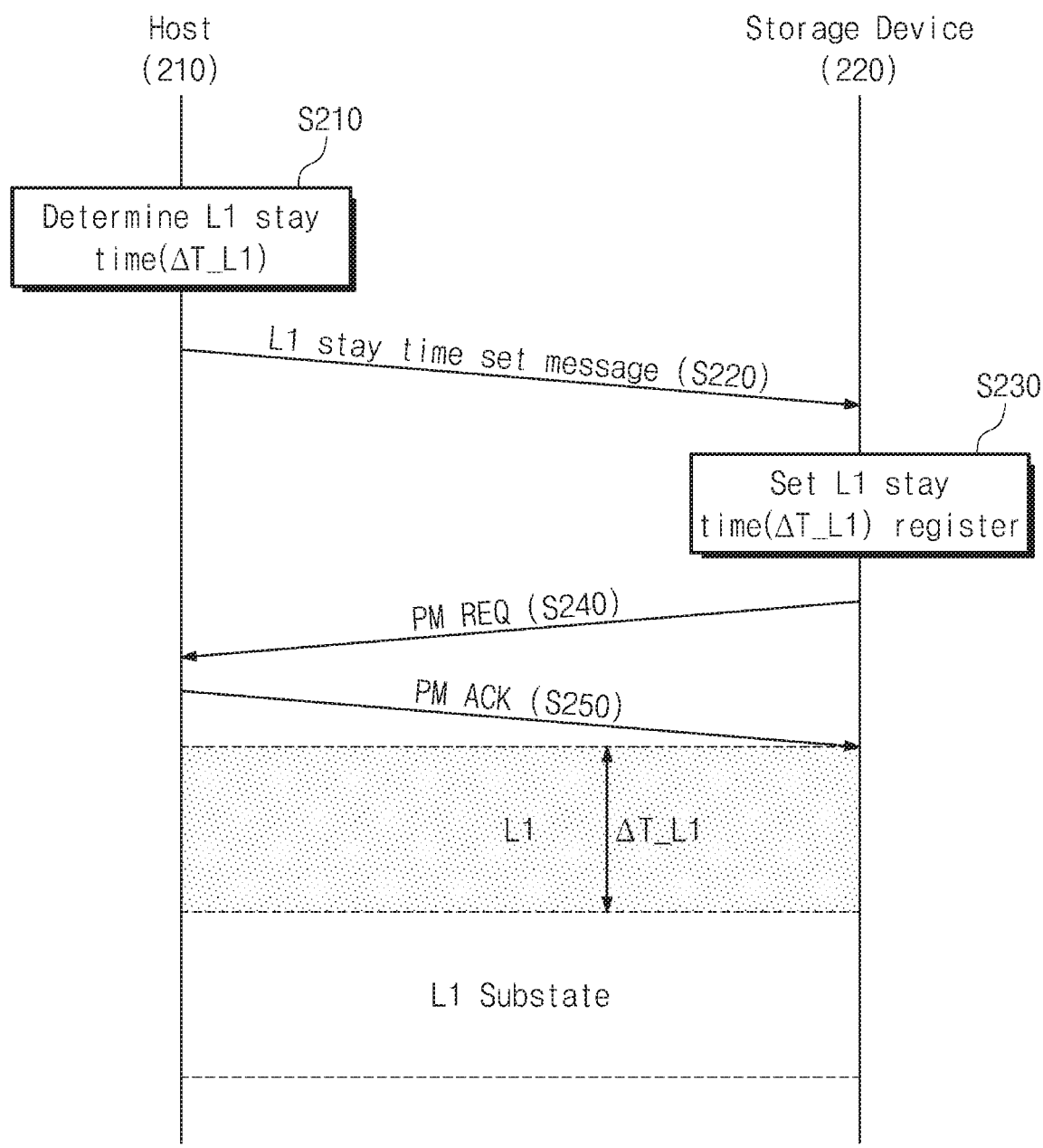
FIG. 8 is a view illustrating a method of setting a link state performed in a memory system of FIG. 6.

FIG. 8 is a view illustrating a method of setting a link state performed in a memory system of FIG. 6. Referring to FIG. 8, a method of setting the holding time ($\Delta T\_L1$) of the first standby state (L1) between the storage device 220 and the host 210 will be described.

In an operation S210, the host 210 determines the holding time ($\Delta T\_L1$) of the first standby state (L1) with reference to a property or a pattern of an access request to be transmitted to the storage device 220. The holding time ($\Delta T\_L1$) of the first standby state (L1) may correspond to not only one command but also a plurality of commands. The holding time ($\Delta T\_L1$) of the first standby state (L1) may be determined with reference to the plurality of commands.

In an operation S220, the host 210 transmits information about the determined holding time ($\Delta T\_L1$) of the first standby state (L1) to the storage device 220. The host 210 may use a separate message or a control signal to transmit information about the holding time ($\Delta T\_L1$) of the first standby state (L1). A method or means for transmitting information about the holding time ($\Delta T\_L1$) of the first standby state (L1) are not limited thereto.

In an operation S230, the storage device 220 may set a link state of the communication port 222 using the holding time ($\Delta T\_L1$) of the first standby state (L1) provided from the host 210.

In an operation S240, the storage device 220 transmits the power management request (PM Req.) to the host 210. The power management request (PM Req.) is a request to put a link state into a low power state. Then the host 210 transmits an acknowledgment message (PM ACK) with respect to the power management request (PM REQ) to the storage device 220. The storage device 220 transits a link state of the communication port 222 to the first standby state (L1) in response to a reception of the allowance message (PM ACK). The acknowledgment message (PM ACK) is a message that transmits the fact that the host 210 recognizes a request of an access to a low power state to the storage device 220. In addition, the storage device 220 counts the elapsed time from a transition time to the first standby state (L1).

If an exit event does not occur while the elapsed time exceeds the holding time ($\Delta T\_L1$), the storage device 220 transits the link state to the second standby state (L1 Substate).

An embodiment where the holding time ($\Delta T\_L1$) is determined in the host 210 was described. After the link state transits to the first standby state (L1), if an exit event occurs before the holding time ($\Delta T\_L1$) elapses, a rapid recovery to the active state (L0) is possible. Thus, the memory system 200 having high speed response performance may be provided.

Figure 9:
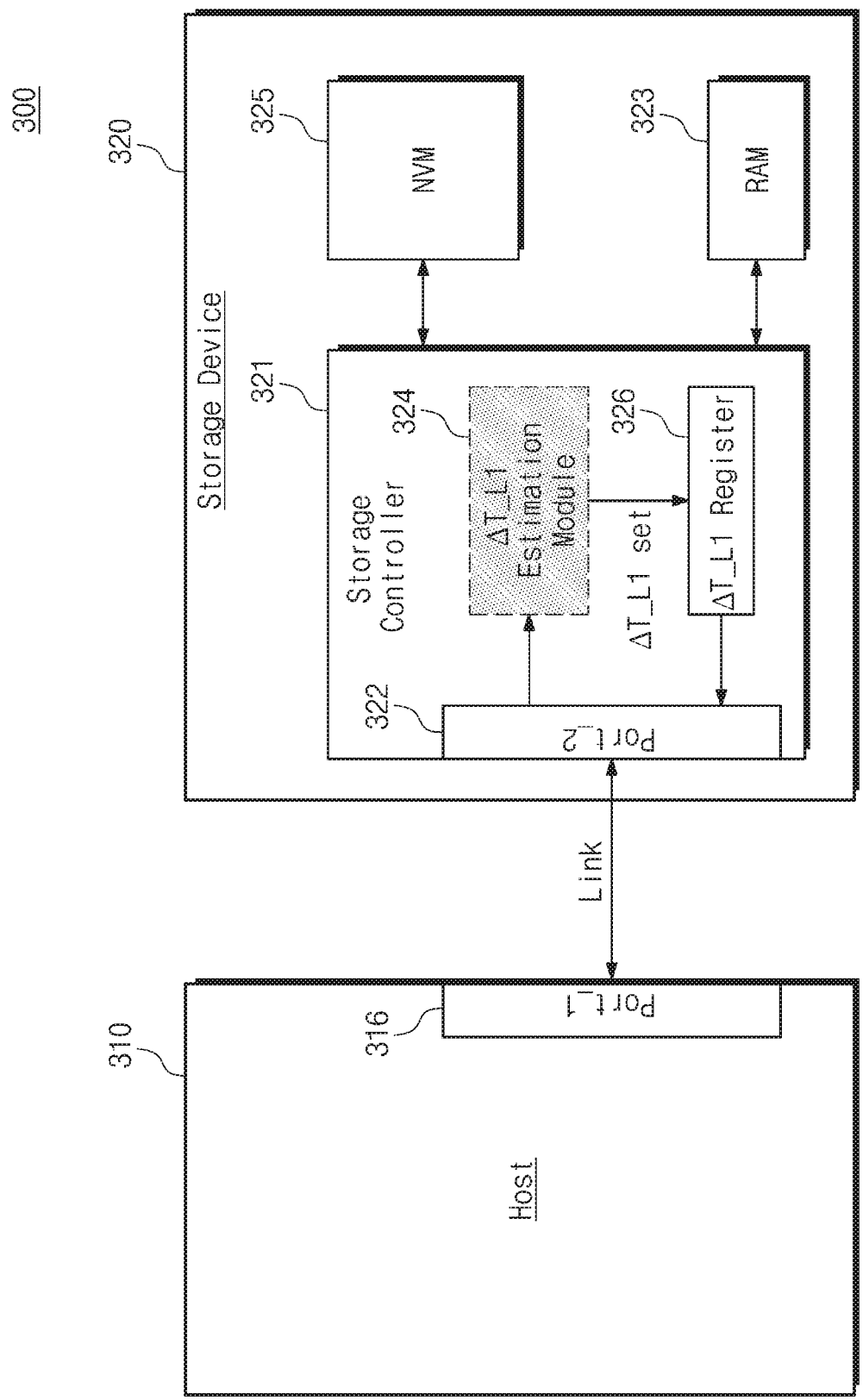
FIG. 9 is a block diagram illustrating a memory system according to other example embodiments of the inventive concepts.

FIG. 9 is a block diagram illustrating a memory system according to other example embodiments of the inventive concepts. Referring to FIG. 9, a memory system 300 includes a host 310 and a storage device 320. The storage device 320 can control a link state of a communication port 322 using a property or a pattern of an access request provided from the host 310. That is, the storage device 320 may set a holding time ($\Delta T\_L1$) of a first standby state (L1) among link states of the second communication port 322.

The host 310 communicates with the storage device 320 using a first communication port 316. The host 310 accesses the storage device 320 without the burden of control of a link state. That is, the host 310 may transmit a command to the storage device 320 without determining the holding time ($\Delta T\_L1$) of the first standby state (L1). The storage device 320 is burdened with setting the holding time ($\Delta T\_L1$) of the first standby state (L1).

The storage device 320 may determine the holding time (ΔT_L1) during which the first standby state (L1) lasts using a property or a pattern of commands received from the host 310. The storage device 320 may include a storage controller 321, a nonvolatile memory device 325, and a RAM 323. Since the nonvolatile memory device 325 and a RAM 323 are the same as those illustrated in FIG. 6, a description thereof is omitted. The storage device 320 may set a link state of the second communication port 322 such that the first standby state (L1) lasts for the determined holding time (ΔT_L1). To set the holding time (ΔT_L1) of the first standby state (L1), the storage controller 321 may include the second communication port 322, a holding time estimation module 324, and a holding time register 326.

The holding time estimation module 324 monitors an access request of the host 310 or a command received through the second communication port 322. The holding time estimation module 324 may determine a link state parameter of the second communication port 322 using a monitoring result. That is, the holding time estimation module 324 may calculate or estimate the holding time (ΔT_L1) of the first standby state (L1) using a property or a pattern of an access request of the host 310 or a command.

In the case where a read command is received from the host 310, the holding time estimation module 324 calculates the holding time (ΔT_L1) of the first standby state (L1) with reference to a size of a read-requested memory area. A link state of the second communication port 322 remains in the first standby state (L1) until a time when a read command is provided and data read out from the nonvolatile memory device 325 is output to the outside of the storage device 320. At this time, the holding time (ΔT_L1) during which the first standby state (L1) lasts may be calculated according to a property of the command. The holding time register 326 may be set according to the determined holding time (ΔT_L1).

The storage controller 321 controls a link state of the second communication port 322 with reference to the holding time (ΔT_L1). That is, the storage controller 321 transits the link state to a second standby state (L1 Substate) after the holding time (ΔT_L1) elapses after the link state transits to the first standby state (L1).

An embodiment where the holding time (ΔT_L1) is determined in the host 310 was briefly described. That is, the storage device 320 may determine the holding time (ΔT_L1) during which the first standby state (L1) lasts using a property or a pattern of the received commands. Through that function described above, it is possible to control a link state of the communication ports 316 and 322 that satisfies power and performance requests of the storage device 320 while reducing a burden of the host 310.

Figure 10:
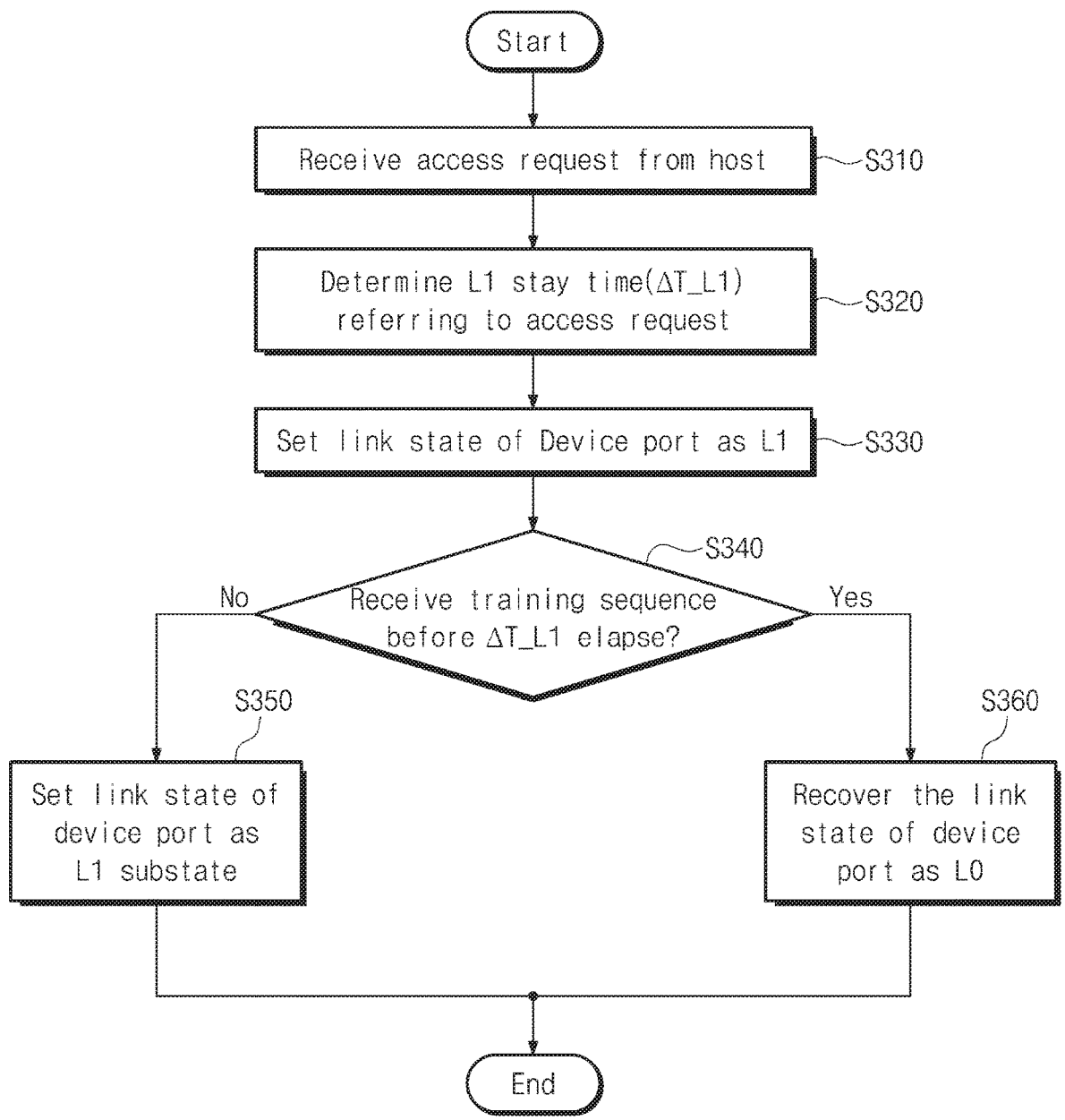
FIG. 10 is a flowchart illustrating a method of controlling a link state of a storage device illustrated in FIG. 9.

FIG. 10 is a flowchart illustrating a method of controlling a link state of a storage device illustrated in FIG. 9. Referring to FIG. 10, the storage device 320 may determine the holding time (ΔT_L1) of the first standby state (L1) with reference to a property of an access request and a command from the host 310.

In an operation S310, the storage device 320 receives an access request transmitted from the host 310. For example, the storage device 320 may receive a read command, a write command, and an address transmitted from the host 320.

In an operation S320, the holding time estimation module 324 of the storage device 320 calculates the holding time (ΔT_L1) during which the first standby state (L1) lasts using information about the access request. For example, in the case where a read command is provided, the holding time (ΔT_L1) of the first standby state (L1) may be calculated using a memory size, channel information, etc. using an address. In addition, in the case where a plurality of commands is provided, the holding time estimation module 324 may determine holding time (ΔT_L1) during which the first standby state (L1) lasts using an execution pattern of the commands.

In an operation S330, the storage controller sets the second communication port 322 such that the first standby state (L1) lasts for the determined holding time (ΔT_L1). That is, the storage controller 321 may set the determined holding time (ΔT_L1) in the holding time register 326.

In an operation S340, the storage controller 321 monitors whether an exit event occurs. For example, the storage controller 321 may monitor whether a training sequence for a wakeup of the communication ports 316 and 322 is received from the host 310 before the holding time (ΔT_L1) elapses. In the case where the exit event does not occur before the holding time (ΔT_L1) elapses (No direction), the procedure moves to an operation S350. In the case where the exit event occurs before the holding time (ΔT_L1) elapses (Yes direction), the procedure moves to an operation S360.

In the operation S350, the storage controller 321 transits a link state of the second communication port 322 to the second standby state (L1 Substate). That is, a power mode of the second communication port 322 may be set to a sleep level higher than the first standby state (L1).

In the operation S360, the storage controller 321 transits a link state of the second communication port 322 to the active state (L0) to activate a communication with the host 310. In the active state (L0), the storage controller 321 and the host 310 can transmit data to each other or can exchange a command or a control signal with each other without limitation.

Figure 11:
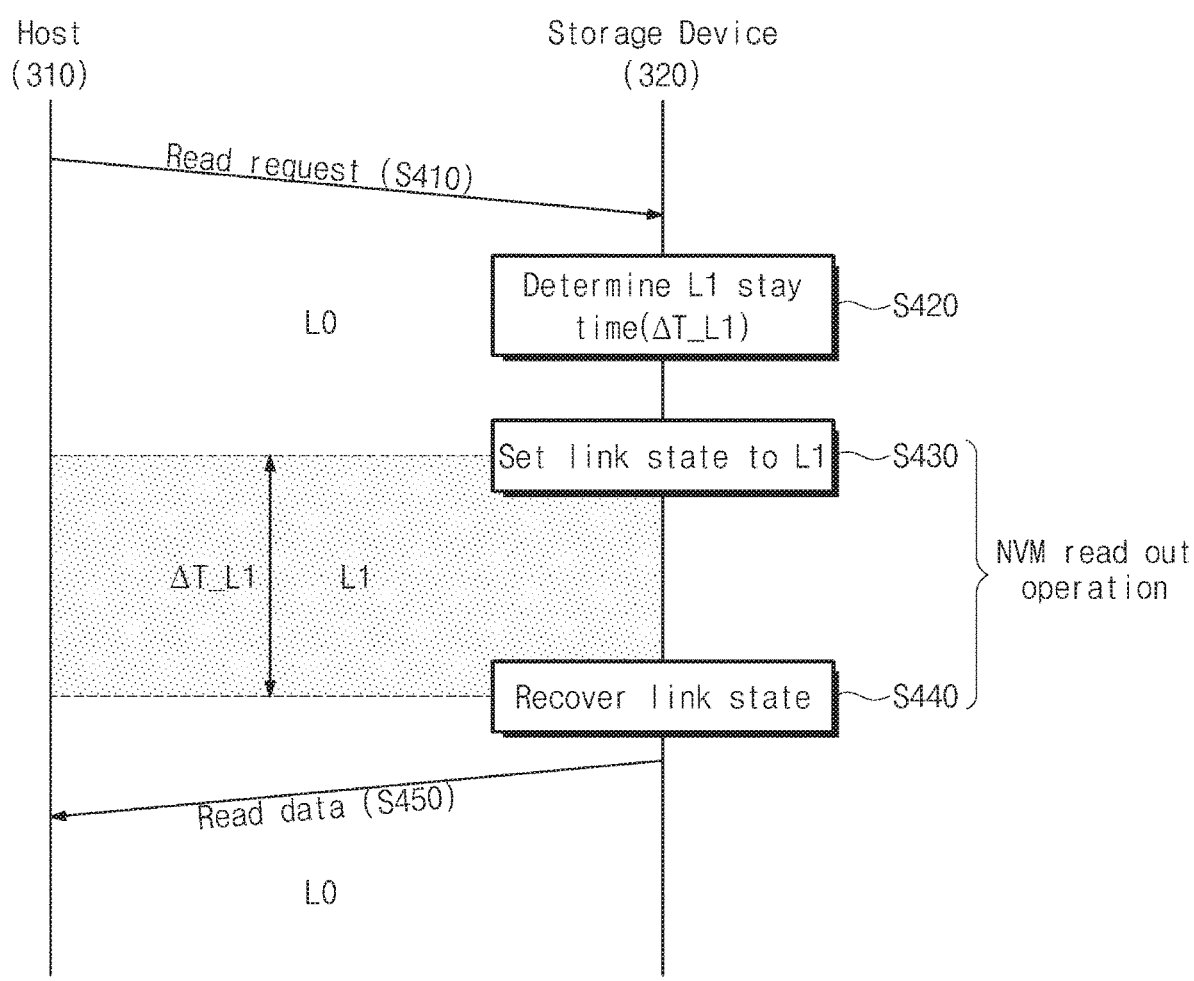
FIG. 11 is a view illustrating a method of setting a link state performed in a memory system of FIG. 9.

FIG. 11 is a view illustrating a method of setting a link state performed in a memory system of FIG. 9. Referring to FIG. 11, a method of determining the holding time (ΔT_L1) of the first standby state (L1) and controlling a link state according to the determined holding time (ΔT_L1) in the storage device 320 will be described. That operation will be described using a case where a read request from the host 310 is transmitted as an example.

In an operation S410, the host 310 transmits a read request to the storage device 320. The read request may include a command and an address.

In an operation S420, the storage device 320 receives the read request and determines the holding time (ΔT_L1) of the first standby state (L1) with reference to a property of the received read request. The holding time (ΔT_L1) of the first standby state (L1) may be determined considering a size of read requested data using an address. A reception of the read request is performed when a link state of the communication ports 316 and 322 is in the active state (L0).

In an operation S430, the storage device 320 sets a link state of the second communication port 322 to the first standby state (L1) using the determined holding time (ΔT_L1). The storage device 320 reads out a memory area of the read requested nonvolatile memory device 325 for the holding time (ΔT_L1) during which the second communication port 322 remains in the first standby state (L1).

In an operation S440, as the holding time (ΔT_L1) elapses, the storage device 320 performs a recovery process for recovering a link state of the second communication port 322 to the active state (L0). For example, in a recovery step, a clock transmitting/receiving function or a data transmitting/receiving function of the communication ports 316 and 322 may be activated.

In an operation S450, the storage device 320 transmits data read from the nonvolatile memory device 325 to the host 310 through the communication ports 316 and 322 recovered to the active state (L0).

A method of determining a parameter for controlling a link state in the storage device 320 was described. A determination of the holding time (ΔT_L1) of the first standby state (L1) by the storage device 320 can reduce a burden of the host 310 and can improve a power characteristic of the communication ports and a response characteristic of the storage device 320.

According to some example embodiments of the inventive concepts, the storage device according to the example embodiments of the inventive concepts enters a standby state where an exit time of a link state is comparatively short and if an exist event does not occur, enters a standby state where an exit time is comparatively long. Time of the standby state where an exit time is comparatively short may be determined by a property or a pattern of the command. Thus, the storage device may provide a link state of a communication port that can effectively manage power and rapidly respond to a request of the host.

The contents described above are example embodiments for implementing the inventive concepts. The inventive concepts may include not only the embodiments described above but also embodiments in which a design is simply or easily capable of being changed. The inventive concept may also include technologies easily changed to be implemented using the example embodiments.

What is claimed is:

1. A method of controlling a link state of a communication port of a storage device, the method comprising:
   setting the link state of the communication port to a link active state to exchange data with a host;
   determining a holding time of a first standby state among link states of the communication port;
   changing the link state of the communication port to the first standby state;
   monitoring whether an exit event occurs during the holding time; and
   changing the link state of the communication port to a second standby state in response to the exit event not occurring during the holding time,
   wherein a recovery time from the first standby state to the link active state is shorter than a recovery time from the second standby state to the link active state, and
   the determining determines the holding time of the first standby state, based on information about the holding time from the host or according to a property or a pattern of an access request received by the storage device.

2. The method of controlling the link state of claim 1, wherein the host determines the holding time based on a property or a pattern of the access request provided to the storage device.

3. The method of controlling the link state of claim 1, further comprising:
   transiting from the first standby state to the link active state without entering the second standby state in response to the exit event occurring before the holding time elapses.

4. The method of controlling the link state of claim 1, wherein the communication port uses a PCIe (peripheral component interconnect express) protocol, the link active state is a 'L0' state, the first standby state is a 'L1' state, and the second standby state is a 'L1 Substate' state.

5. The method of controlling the link state of claim 1, wherein the storage device is an NVMe-based solid state drive.

6. A storage device comprising:
   a plurality of nonvolatile memory devices; and
   at least one central processing unit (CPU) configured to,
      control the plurality of nonvolatile memory devices based on an access request provided from a host through a serial communication port, and
      change a link state of the serial communication port from a link active state that is configured to exchange data with the host to a first standby state in response to a power management request,
   wherein the serial communication port is configured to enter the first standby state after a holding time of the first standby state is set, and
   wherein the CPU is further configured to determine the holding time of the first standby state based on information about the holding time from the host or according to a property or a pattern of the access request provided from the host.

7. The storage device of claim 6, wherein the CPU is configured to change the link state of the serial communication port from the first standby state to the link active state in response to the CPU receiving a new access request before the holding time elapses.

8. The storage device of claim 6, wherein the CPU is configured to change the link state of the serial communication port from the first standby state to a second standby state in response to a new access request not being received by the CPU before the holding time elapses,
   wherein a recovery time from the first standby state to the link active state is shorter than a recovery time from the second standby state to the link active state.

9. The storage device of claim 8, wherein the serial communication port is configured to use a PCIe protocol wherein, the link active state is a 'L0' state, the first standby state is a 'L1' state, and the second standby state is a 'L1 Substate' state.

10. The storage device of claim 6, wherein the CPU is further configured to receive the holding time that is determined in the host based on a property or a pattern of the access request.

11. The storage device of claim 6, wherein the CPU is configured to determine the holding time based on a property or a pattern of the access request.

12. The storage device of claim 8, wherein the serial communication port is configured to consume greater power in the first standby state than in the second standby state.

13. A storage controller comprising:
   a communication port configured to,
      operate in a plurality of link states including a link active state, a first standby state, and a second standby state,
      communicate with a host while in the link active state,
      receive communications while in the first standby state,
      transition to the second standby state based on a holding time if an exit event has not occurred, and
      not receive power while in the second standby state;
   a central processing unit (CPU) configured to,
      transmit read/write control information to control nonvolatile memory devices,
      set the communication port to one link state from among the plurality of link states,
      determine the holding time of the first standby state based on a property or pattern of an access request received from the host, monitor communications received by the communication port while the communication port is in the first standby state to determine whether the exit event has occurred, and set the communication port to the active link state if the exit event occurs while the communication port is in the first standby state; and a flash interface configured to exchange data with the nonvolatile memory devices based on the read/write control information.

14. The storage controller of claim 13, wherein the CPU is further configured to:

control the read and write operations of a random access memory (RAM), and store temporarily read data or write data in the RAM.

15. The storage controller of claim 13, wherein the communication port includes a register configured to store the holding time therein.

16. The storage controller of claim 13, wherein the CPU is further configured to determine the holding time based on a received read request, a received write request or a pattern of received requests.

* * * * *